United States Patent
White

(10) Patent No.: US 8,719,882 B2
(45) Date of Patent: May 6, 2014

(54) SYSTEM AND METHOD FOR SELECTIVELY RECEIVING REQUIRED SATELLITE TELEVISION CHANNELS

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 318 days.

(21) Appl. No.: 12/636,197

(22) Filed: Dec. 11, 2009

(65) Prior Publication Data

US 2011/0145853 A1 Jun. 16, 2011

(51) Int. Cl.
*H04N 7/173* (2011.01)

(52) U.S. Cl.
USPC .............. 725/93; 725/25; 725/27; 725/31; 725/87; 725/90; 705/14.1

(58) Field of Classification Search
None
See application file for complete search history.

(56) References Cited

U.S. PATENT DOCUMENTS

| | | | |
|---|---|---|---|
| 6,057,872 A * | 5/2000 | Candelore | 725/23 |
| 2003/0126595 A1 * | 7/2003 | Sie et al. | 725/29 |
| 2003/0200544 A1 * | 10/2003 | Ellis et al. | 725/46 |
| 2008/0046935 A1 * | 2/2008 | Krakirian | 725/87 |
| 2008/0148322 A1 | 6/2008 | Howcroft | |
| 2008/0271091 A1 | 10/2008 | White et al. | |
| 2009/0019497 A1 | 1/2009 | White et al. | |

* cited by examiner

*Primary Examiner* — Joshua Taylor
(74) *Attorney, Agent, or Firm* — Guntin & Gust, PLC; Douglas Schnabel

(57) ABSTRACT

A system includes a video-on-demand server and an authentication server. The video-on-demand server is configured to provide video-on-demand content through a broadband connection to a set-top box device. The authentication server is in communication with the video-on-demand server. The authentication server is configured to receive a request to allow access to a video-on-demand package that includes the video-on-demand content, to determine if a user is currently authorized to constantly receive a broadcast package that includes a plurality of broadcast channels related to the video-on-demand content, and to authorize a broadcast channel in the broadcast package when not currently authorized to receive the broadcast package.

20 Claims, 4 Drawing Sheets

SYSTEM AND METHOD FOR SELECTIVELY RECEIVING REQUIRED SATELLITE TELEVISION CHANNELS

FIELD OF THE DISCLOSURE

The present disclosure generally relates to communications networks, and more particularly relates to a system and a method for selectively receiving required satellite television channels.

BACKGROUND

Television content may come from a cable, satellite, broadcast or other television source, or from an Internet protocol television (IPTV) network, and is typically in a standard-definition (SD) or high-definition (HD) format. The television content source for a particular customer can depend on a preference of the customer, on the location of the customer, and/or the type of network owned by the television service provider. The television service provider can offer the user a variety of different television programs and/or movies. For example, the television service provider can supply users with real-time television programs that are typically available for the users to watch only at a specific date and time. The television service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
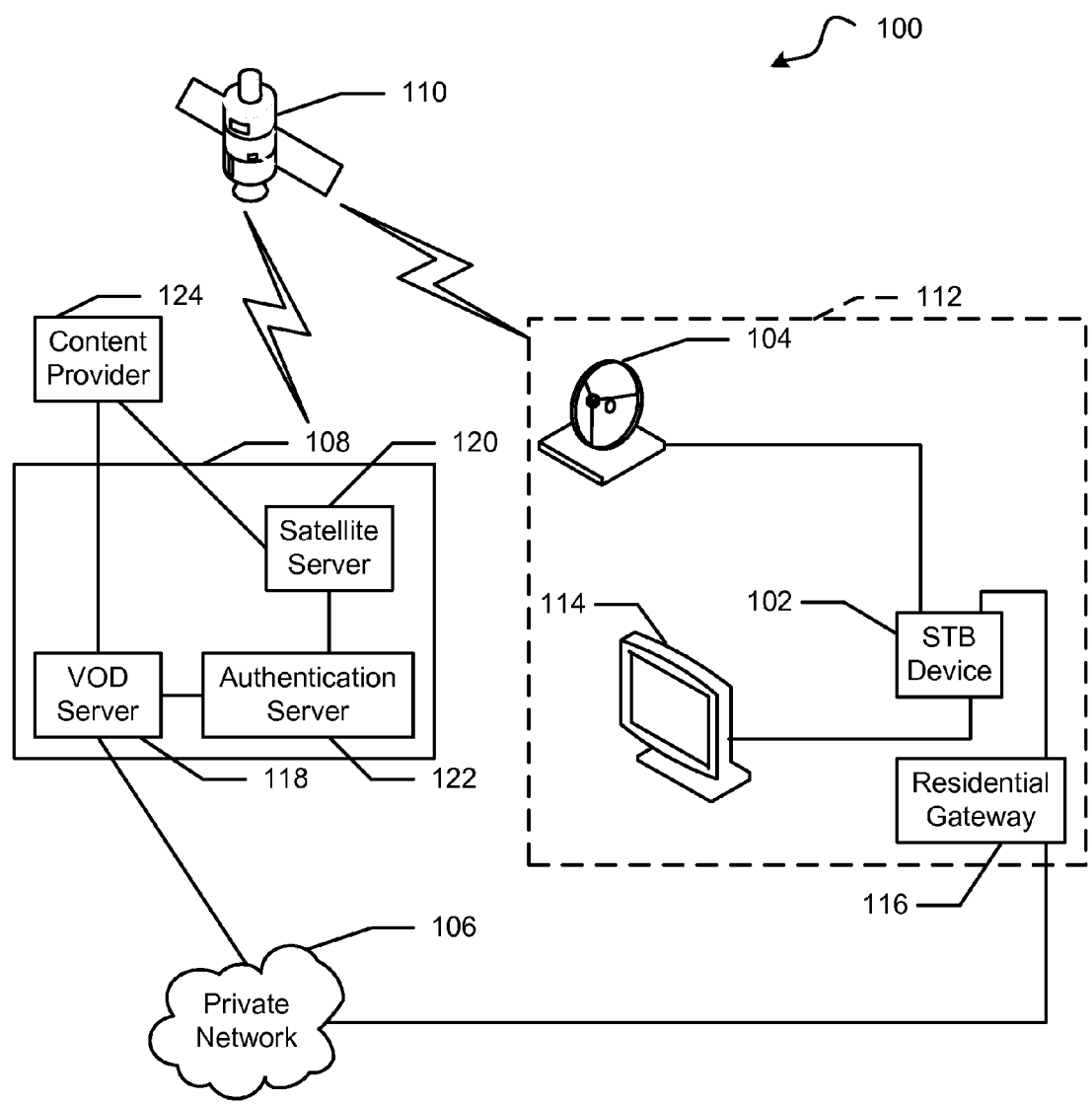
FIG. 1 is a block diagram of a satellite television network with an Internet Protocol connection.

FIG. 1 shows a television system 100 including a set-top box device 102, a satellite dish 104, a private network 106, a video head-end office (VHO) 108, and a television content satellite 110. In an embodiment, a customer premises 112 can include the set-top box device 102, the satellite dish 104, a display device 114, and a residential gateway 116 having a built-in very-high-bit-rate digital subscriber loop (VDSL) modem or optical network termination. The VHO 108 includes a video-on-demand (VOD) server 118, a satellite server 120, and an authentication server 122.

The set-top box device 102 is in communication with the satellite dish 104 via an internal network, such as a coaxial cable, an Ethernet cable, a wireless network, or the like. The set-top box device 102 is also in communication with the display device 114 via a video cable such as a coaxial cable, a composite video cable, a Super video (S-video) cable, a component video cable, a High-Definition Multimedia Interface (HDMI) cable, or the like. The set-top box device 102 is also in communication with the residential gateway 116, which in turn is in communication with the VOD server 118 of the VHO 108 via the private network 106. The VOD server 118 is in communication with the authentication server 122 and with a content provider 124. The satellite server 120 is in communication with the television content satellite 110, the authentication server 122, and the content provider 124.

The set-top box device 102 can receive television content from the television content satellite 110 via the satellite dish 104, and can output the television content to the display device 114. The television content can be linear television content, such that the television content is broadcast at a predetermined time. The linear television content can be a news broadcast, a live sporting event, a new episode of a television series, a movie, or the like. The linear television content can be continually sent from the satellite server 120 to the satellite dish 104 via the television content satellite 110. Additionally, a selected video stream of linear television content can be sent as a continuous video stream from the satellite dish 104 to the display device 114 by the set-top box device 102, as opposed to a video stream that has been downloaded and stored by the set-top box device for later display. The satellite server 120 can receive the linear television content from the content provider 124 and can encode the content for transmission to the set-top box device 102. The satellite server 120 can then provide the encoded linear television content to the television content satellite 110, which in turn can send the encoded content to the satellite dish 104. Additionally, the set-top box device 102 can receive Internet Protocol (IP) video streams from the VHO 108 via the private network 106, and can output the video streams to the display device 114. The IP video streams can be VOD video streams from the VOD server 118 in the VHO 108.

Figure 2:
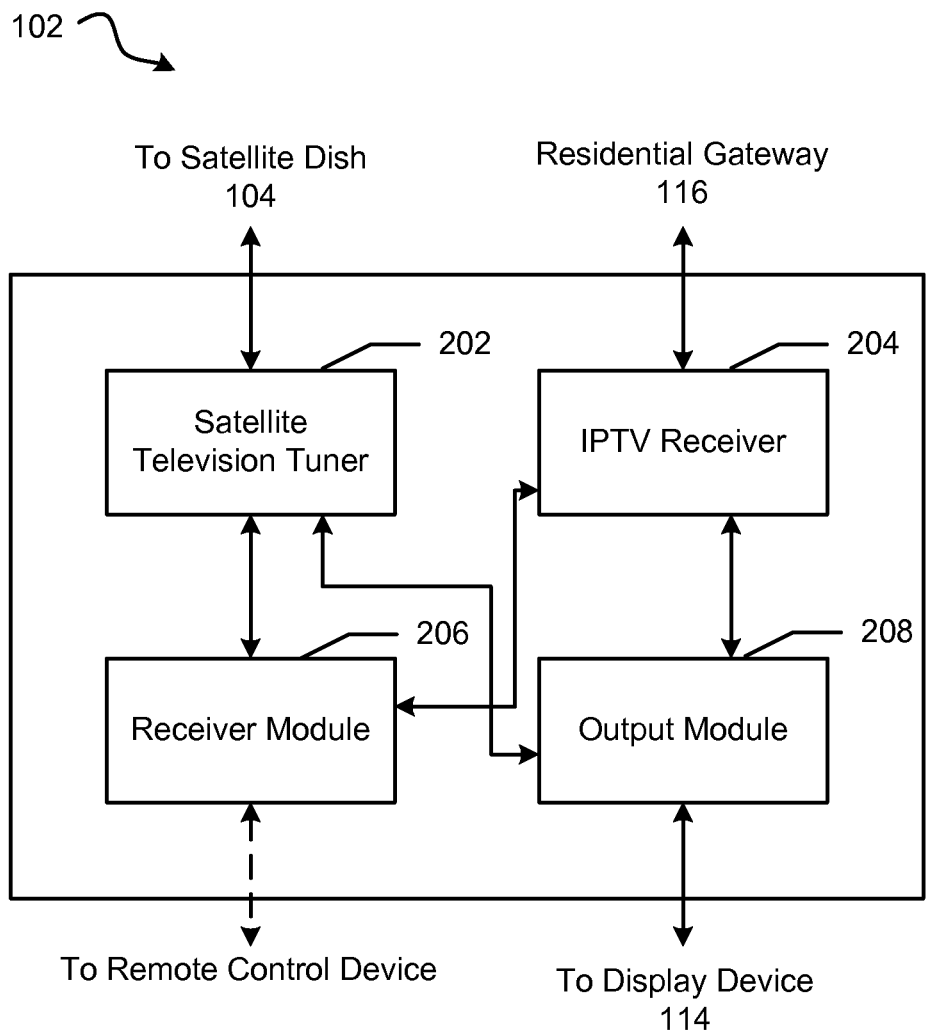
FIG. 2 is a block diagram of a set-top box device.

FIG. 2 shows a block diagram of the set-top box device 102 including a satellite television tuner 202, an IPTV receiver 204, a receiver module 206, and an output module 208. The satellite tuner 202 is in communication with the satellite dish 104, the receiver module 206, and the output module 208. The IPTV receiver 204 is in communication with the residential gateway 116, the receiver module 206, and the output module 208. The receiver module 206 is also in communication with a remote control device (not shown). The output module 208 is also in communication with the display device 114.

The user of the set-top box 206 can request that the satellite television tuner 202 receive and decode linear television content from the satellite dish 104 to be output by the output module 208 to the display device 114. When the receiver module 206 receives a linear television channel request from the remote control device, the receiver module 206 can send the request to the satellite tuner 202 for the corresponding channel from the television content satellite 110 via the satellite dish 104. The satellite television tuner 202 can receive and decode the specific television content from the satellite dish 104, so that the set-top box device 102 can perform different functions on the television content. The television content can then be sent to the display device 114 via the output module 208.

The satellite television tuner 202 can generally process one video stream at a time. Thus, if the user requests a new channel of television content to be displayed on the display device 114, the satellite television tuner 202 can stop processing the original video stream and can begin to process a new video stream from the satellite dish 104. Upon decoding the new video stream, the satellite television tuner 202 sends the new video stream to the output module 208 to be output to the display device 114.

The content provider 124 can require that a user is authorized to access at least one broadcast channel of a broadcast package and a VOD package associated with the VOD content prior to the user being authorized to receive the VOD content. For example, the content provider 124 can provide the user with a broadcast package that includes multiple linear television movie channels. Each of the liner television movie channels can be constantly broadcast to the satellite dish 104 via the television content satellite 110 and the satellite server 120. The satellite tuner 202 can decode and send a specific channel from the satellite dish 104 to the output module 208 to be output to the display device 114. The content provider 124 can also provide the user with the movies in the broadcast package as VOD movies through the associated VOD package. However, if the user is not currently authorized to access the broadcast package, the content provider 124 preferably will not allow the user to access the associated VOD content.

If the user wants to view VOD content, the user can request that the IPTV receiver 204 receive the VOD content from the VOD server 118. When the VOD server 118 receives the request for the VOD package from the IPTV receiver 204, the VOD server can communicate with the authentication server 122 to determine whether the user currently has access to at least one of the broadcast channels of the broadcast package associated with the requested VOD package. If the authentication server 122 determines that the user is currently authorized to access the broadcast package, the authentication server can update the profile for the set-top box device 102 to grant the user access to the VOD package.

However, if the authentication server 122 determines that the user is not currently authorized to access the broadcast package, the authentication server can update the profile for the set-top box device 102 to grant the user access to one of the broadcast channels in the broadcast package. The authentication server 122 can grant the user access to the one of the broadcast channels by transmitting encryption keys for the one of the broadcast channels to the set-top box device 102 via the satellite server 120, the television content satellite 110, the satellite dish 104, and the satellite tuner 202. The updated profile for the set-top box device 102 can also continue to disallow access to the other broadcast channels in the broadcast package. When the user is granted access to the broadcast channel, the authentication server 122 can also grant the set-top box device 102 access to the VOD package from the VOD server. Thus, the IPTV receiver 204 can receive the VOD content from the VHO 108, and can process the VOD content for use by the set-top box device 102. The output module 208 can send the video stream to the display device 114.

Figure 3:
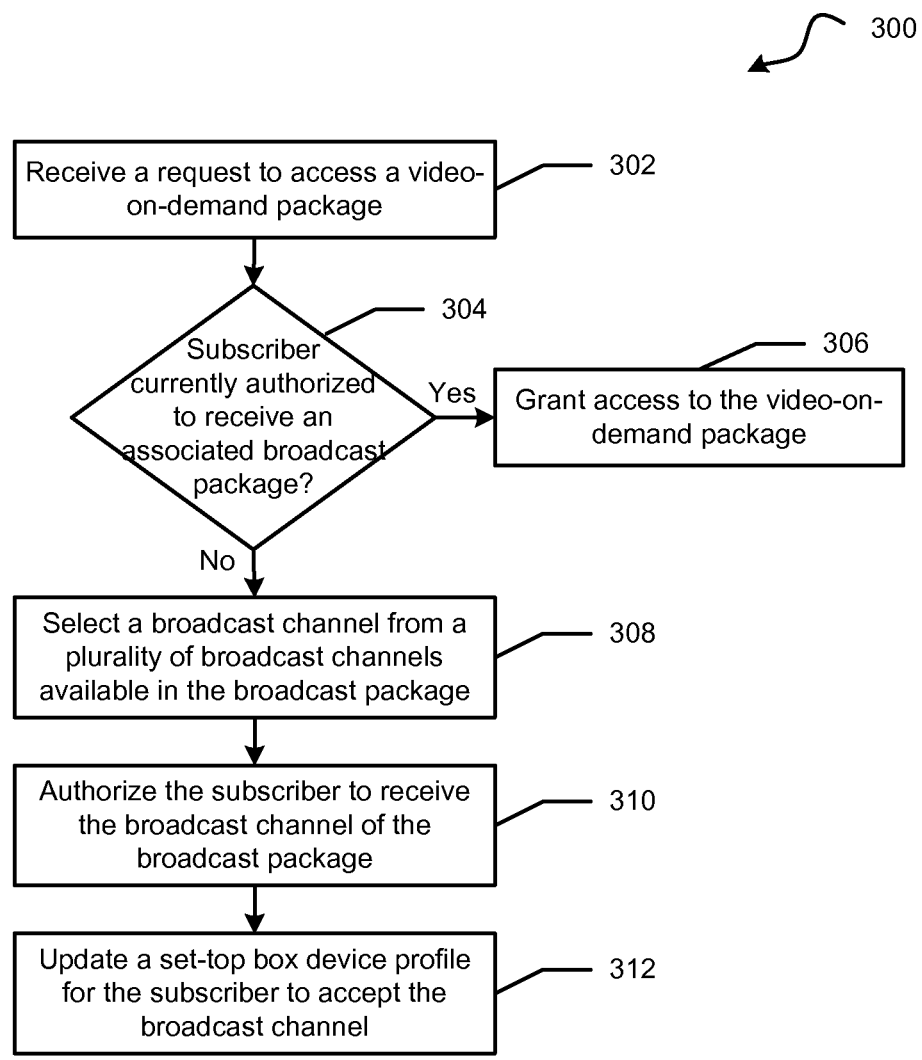
FIG. 3 is a flow diagram of a method for selectively granting access to a broadcast channel in response to a request to an associated video-on-demand package.

FIG. 3 shows a flow diagram of a method 300 for selectively granting access to a broadcast channel is response to a request for a VOD package. At block 302, a request to access the VOD package is received. The request for the VOD package can be received from a set-top box device via a broadband connection. The broadband connection can be any connection that utilizes Internet Protocol to provide the VOD content, such as a wired Internet connection or a wireless Internet connection. At block 304, a determination is made whether a user is currently authorized to receive an associated broadcast package. The broadcast package is preferably associated with and offered by the same content provider as the VOD package. Broadcast channels of the broadcast package can be sent to the set-top box device via a satellite connection.

If the user is currently authorized to receive the broadcast package, access is granted to the VOD package at block 306. If the user is not currently authorized to receive the broadcast package, a broadcast channel is selected from a plurality of broadcast channels available in the broadcast package at block 308. At block 310, the user is authorized to receive the broadcast channel of the broadcast package. The user can be authorized to receive the broadcast channel by transmitting encryption keys for the broadcast channel to the set-top box device associated with the user. A set-top box device profile for the user is updated to accept the broadcast channel at block 312.

Figure 4:
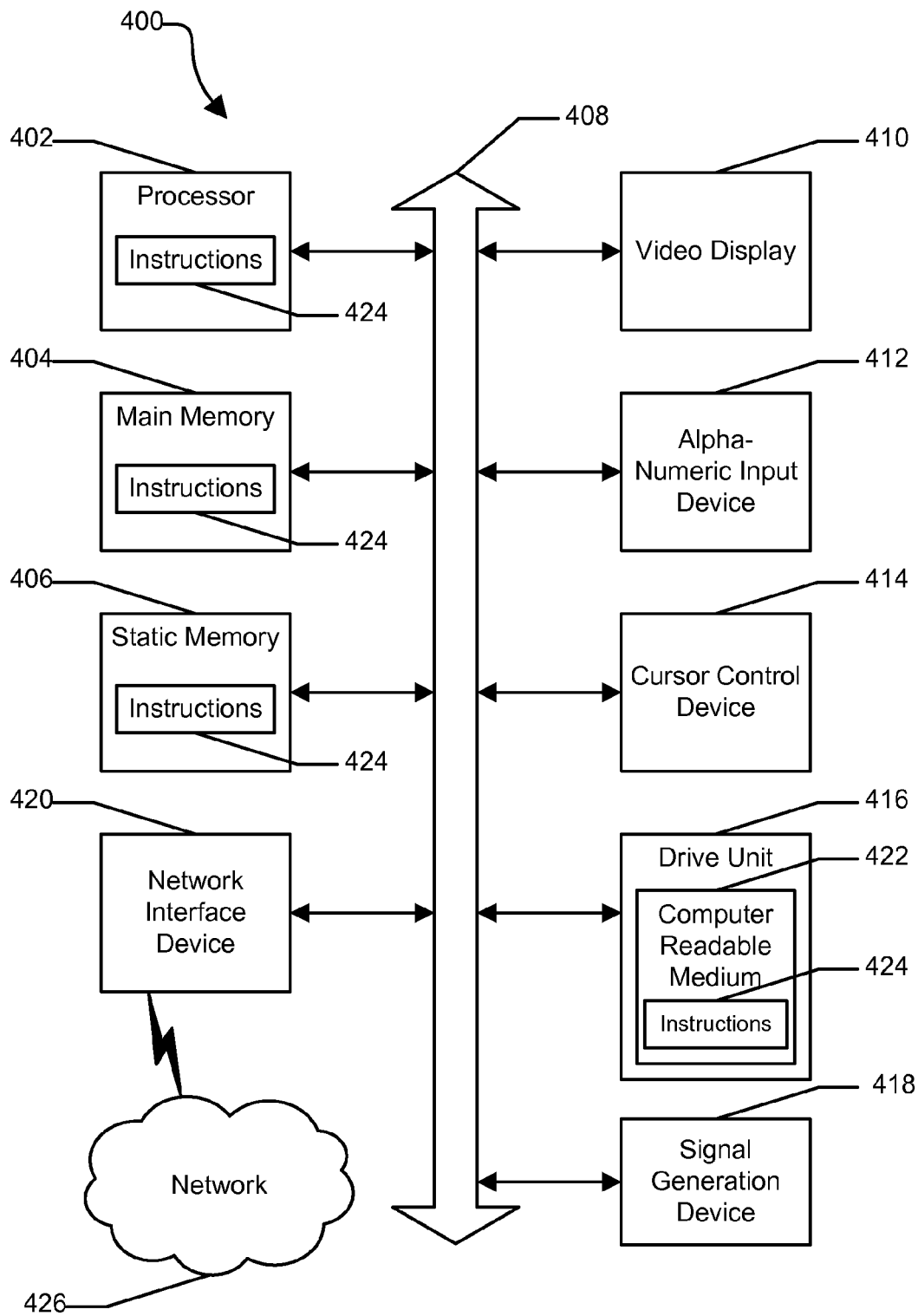
FIG. 4 is a block diagram of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid state display, or a cathode ray tube (CRT). Additionally, the computer system 400 may include an input device 412 such as a keyboard, and a cursor control device 414 such as a mouse. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving at a server a request to access video-on-demand content of a video-on-demand package via a broadband connection, wherein the video-on-demand package includes a plurality of video-on-demand channels, a video-on-demand channel of the plurality of video-on-demand channels comprising the video-on-demand content;
   determining at the server if a user associated with the request to access the video-on-demand content of the video-on-demand package is authorized to receive a related broadcast package related to the video-on-demand package, wherein the related broadcast package includes a plurality of broadcast channels, wherein the video-on-demand content is available as broadcast content within a broadcast channel of the plurality of broadcast channels of the related broadcast package;
   authorizing equipment of the user to receive a broadcast channel of the plurality of broadcast channels of the related broadcast package related to the video-on-demand package responsive to determining that the user is not authorized to receive the related broadcast package, while blocking authorization of the user to a remaining plurality of broadcast channels of the plurality of broadcast channels of the related broadcast package, wherein the broadcast channel is received via a satellite connection;
   authorizing the equipment of the user to receive the video-on-demand package when authorizing the user to receive the broadcast channel of the related broadcast package related to the video-on-demand package; and
   updating a user device profile responsive to determining that the user is not authorized to receive the related broadcast package related to the video-on-demand package.

2. The method of claim 1 further comprising:
   selecting the broadcast channel from the plurality of broadcast channels available in the related broadcast package prior to authorizing the user to receive the broadcast channel,
   wherein the video-on-demand channels are available for delivery to a particular device by way of a unicast transmission in response to a request received from the particular device, and
   wherein the broadcast channels are available for delivery to a plurality of devices by way of a multicast transmission of programs that are available only at a specific date and time.

3. The method of claim 1, wherein the plurality of broadcast channels of the related broadcast package comprises content of a plurality of television movie channels, and wherein the video-on-demand package comprises the content of the plurality of television movie channels.

4. The method of claim 1 further comprising:
   updating the user device profile to accept the broadcast channel.

5. The method of claim 1 wherein the related broadcast package and the video-on-demand package are from a common content provider.

6. The method of claim 1 wherein authorizing the user includes transmitting encryption keys for the broadcast channel to a set-top box device of the user.

7. The method of claim 1 wherein updating the user device profile includes transmitting encryption keys for the broadcast channel to the user device of the user.

8. The method of claim 1 wherein the authorizing of the equipment of the user to receive the broadcast channel of the related broadcast package related to the video-on-demand package comprises updating a profile of a set-top box.

9. A method comprising:
   receiving at a server a request to access video-on-demand content of a video-on-demand package via a broadband connection, wherein the video-on-demand package includes a plurality of video-on-demand channels, a video-on-demand channel of the plurality of video-on-demand channels comprising the video-on-demand content;
   determining at the server that a user associated with the request to access the video-on-demand content of the video-on-demand package is not authorized to receive a related broadcast package related to the video-on-demand package, wherein the related broadcast package includes a plurality of broadcast channels, wherein the video-on-demand content is available as broadcast content within a broadcast channel of the plurality of broadcast channels of the related broadcast package;

selecting a broadcast channel from the plurality of broadcast channels in the related broadcast package;

authorizing equipment of the user to receive the broadcast channel of the plurality of broadcast channels of the related broadcast package related to the video-on-demand package, wherein the broadcast channel is received via a satellite connection, while blocking authorization of the user to a remaining plurality of broadcast channels of the plurality of broadcast channels of the related broadcast package;

authorizing the equipment of the user to receive the video-on-demand package when authorizing the user to receive the broadcast channel of the related broadcast package related to the video-on-demand package; and updating a set-top box device profile for the user to accept the broadcast channel.

10. The method of claim 9, wherein the plurality of broadcast channels of the related broadcast package comprises content of a plurality of television movie channels, and wherein the video-on-demand package comprises the content of the plurality of television movie channels.

11. The method of claim 9 wherein the related broadcast package and the video-on-demand package are from a common content provider.

12. The method of claim 9 wherein authorizing the user includes transmitting encryption keys for the broadcast channel to a set-top box device of the user.

13. The method of claim 9 wherein the authorizing the equipment of the user to receive the broadcast channel of the related broadcast package related to the video-on-demand package comprises updating a profile of a set-top box.

14. A system comprising:

a video-on-demand server configured to provide video-on-demand content through a broadband connection to a set-top box device; and an authentication server in communication with the video-on-demand server, the authentication server comprising a memory having executable instructions and a processor coupled with the memory, wherein executing the instructions causes the processor to perform operations comprising:

receiving a request to allow access to the video-on-demand content of a video-on-demand package that includes the video-on-demand content;

determining if a user is authorized to receive a related broadcast package that includes a plurality of broadcast channels related to the video-on-demand content, wherein the video-on-demand content is available as broadcast content within a broadcast channel of the plurality of broadcast channels of the related broadcast package;

authorizing user access to a broadcast channel of the plurality of broadcast channels of the related broadcast package when the user is not authorized to receive the related broadcast package, while blocking authorization of the user to a remaining plurality of broadcast channels of the plurality of broadcast channels of the related broadcast package;

authorizing user access to the video-on-demand package when authorizing the user access to the broadcast channel of the related broadcast package related to the video-on-demand package; and updating a device profile of the set-top box to generate an updated set-top box profile responsive to determining that the user is not authorized to receive the related broadcast package related to the video-on-demand package.

15. The system of claim 14 further comprising:

a satellite broadcast server in communication with the authentication server, the satellite broadcast server comprising a memory having executable instructions and a processor coupled with the memory, wherein executing the instructions causes the processor to perform operations comprising providing the broadcast channel to the set-top box device via satellite communication in response to an authentication signal from the authentication server.

16. The system of claim 14 wherein the operations comprise selecting the broadcast channel from the plurality of broadcast channels in the related broadcast package prior to authorizing the user to receive the broadcast channel.

17. The system of claim 14, wherein the plurality of broadcast channels of the related broadcast package comprises content of a plurality of television movie channels, and wherein the video-on-demand content comprises the content of the plurality of television movie channels.

18. The system of claim 14 wherein the operations comprise updating a set-top box device profile for the user to accept the broadcast channel.

19. The system of claim 14 wherein the related broadcast package and the video-on-demand package are from a common content provider.

20. The system of claim 14 wherein authorizing includes transmitting encryption keys for the broadcast channel to the set-top box device of the user.

* * * * *